United States Patent [19]
Ueno

[11] Patent Number: 6,157,506
[45] Date of Patent: Dec. 5, 2000

[54] WRITE COMPENSATION METHOD AND MAGNETIC DISK APPARATUS ADAPTED FOR HIGH-DENSITY RECORDING

[75] Inventor: Hiroaki Ueno, Kawasaki, Japan

[73] Assignee: Fujitsu Limited, Kawasaki, Japan

[21] Appl. No.: 09/025,115

[22] Filed: Feb. 17, 1998

[30] Foreign Application Priority Data

Mar. 18, 1997 [JP] Japan .................................. 9-065127

[51] Int. Cl.⁷ ........................................................ G11B 5/09
[52] U.S. Cl. ................................. 360/45; 360/46; 360/51
[58] Field of Search ................................... 360/46, 45, 51

[56] References Cited

U.S. PATENT DOCUMENTS 5,583,705  12/1996  Ziperovich et al. ...................... 360/46

FOREIGN PATENT DOCUMENTS

| 52-89307 | 7/1977 | Japan . |
| 53-102007 | 9/1978 | Japan . |
| 56-37812 | 4/1981 | Japan . |
| 56-83819 | 7/1981 | Japan . |
| 59-77607 | 5/1984 | Japan . |
| 59-87610 | 5/1984 | Japan . |
| 7-6306 | 1/1995 | Japan . |

*Primary Examiner*—Andrew L. Sniezek
*Assistant Examiner*—Regina Y. Neal
*Attorney, Agent, or Firm*—Greer, Burns & Crain, Ltd.

[57] ABSTRACT

A write signal is examined so as to recognize occurrence of magnetization reversal for a first bit to be recorded, a second bit preceding the first bit and a third bit preceding the second bit. A write signal reversal for the first bit is delayed by a first delay when the second bit has an associated write signal reversal and when the third bit does not have an associated write signal reversal. A write signal reversal for the first bit is delayed by a second delay set to be smaller than the first delay, when the third bit has an associated write signal reversal and when the second bit has an associated write signal reversal, and a write signal reversal for the first bit is delayed by a third delay set to be smaller than the second delay, when the third bit has an associated write signal reversal and when the first bit does not have an associated write signal reversal.

18 Claims, 12 Drawing Sheets

| Bit | | | Compensation |
|---|---|---|---|
| N−2 | N−1 | N | Bit N |
| 0 | 1 | 1 | $\delta 1$ |
| 1 | 1 | 1 | $\delta 2$ |
| 1 | 0 | 1 | $\delta 3$ |
| OTHERS | | | None |

$\delta 1$ : DELAY (DISPLACE FROM NORMAL RECORDING POSITION) Bit N IN THE DIRECTION OF Bit N+1
$\delta 2$ : DELAY (DISPLACE FROM NORMAL RECORDING POSITION) Bit N IN THE DIRECTION OF Bit N+1
$\delta 3$ : DELAY (DISPLACE FROM NORMAL RECORDING POSITION) Bit N IN THE DIRECTION OF Bit N+1

RELATION BETWEEN DELAYS $0 \leq \delta 3 \leq \delta 2 \leq \delta 1$

EQUAL TO OR SMALLER THAN $\delta 1$

EQUAL TO OR SMALLER THAN $\delta 2$

FIG. 3 PRIOR ART

| Bit | | Compensation |
|---|---|---|
| N-1 | N | Bit N |
| 0 | 0 | None |
| 1 | 0 | None |
| 0 | 1 | None |
| 1 | 1 | Late |

Late : DELAY(DISPLACE FROM THE NORMAL WRITE POSITION)
Bit N by t10 IN THE DIRECTION OF Bit N+1

WRITE COMPENSATION METHOD AND MAGNETIC DISK APPARATUS ADAPTED FOR HIGH-DENSITY RECORDING

BACKGROUND OF THE INVENTION

1. Field of the Invention

The present invention generally relates to write compensation methods and magnetic disk apparatuses and, more particularly, to a write compensation method and a magnetic disk apparatus for correcting a write signal for writing digital information.

Improvement in magnetic recording density in magnetic disk apparatuses is producing increasing small magnetization reversal intervals on a recording medium. Magnetization reversal for preceding recorded information (bit) on the recording medium causes a shift in the position of recording such that the position at which target information is written is displaced from an intended position of magnetization reversal. Such a shift may prevent the information from being read properly. This phenomenon is generally known as non-linear bit shift (described in detail later). Unless the non-linear bit shift is corrected, a displacement between the position of magnetization reversal and an actual write signal occurs.

2. Description of the Related Art

FIG. 1 is a block diagram showing a magnetic disk apparatus 1 according to the related art.

The magnetic disk apparatus 1 writes information on a rotatable magnetic disk 2 formed of a magnetic body such that a write current is supplied to a magnetic head 3 opposite to the magnetic disk 2 so as to generate a magnetic field in the magnetic head 3, thus magnetizing the magnetic disk 2. As the magnetic head 3 is driven by an actuator 4 to move radially (in the direction indicated by the arrow in FIG. 9) with respect to the magnetic disk 2, information is concentrically written on the magnetic disk 2. The magnetic head 3 is supplied with the write current from a head IC 5 so as to generate a magnetic field commensurate with the information to be recorded (hereinafter, simply referred to as target information).

The target information is supplied to a control circuit 6 from an outside apparatus. The control circuit 6 receives the target information and supplies the same to an encoder 7. The encoder 7 converts the target information supplied from the control circuit 6 into nonreturn to zero (NRZ) information to be written on the magnetic disk 2 and outputs the converted information. The output write signal from the encoder 7 is supplied to a write compensation circuit 8. A nonreturn to zero (NRZ) write method writes information using a binary signal pulse train in which an interval of a unit code coincides with an interval of a pulse.

The write compensation circuit 8 detects a bit stream of the output write signal of the encoder 7 and provides compensation in accordance with the pattern of the bit stream. The write signal corrected by the write compensation circuit 8 is supplied to the head IC 5. The head IC 5 supplies, to the magnetic head 3, the write current commensurate with the target information supplied from the write compensation circuit 8.

The signal picked up by the magnetic head 3 is supplied to the head IC 5 to be amplified thereby. The amplified signal is then supplied to an automatic gain control (AGC) circuit 9 which controls the signal supplied by the head IC 5 to have a regular amplitude and outputs the thus controlled signal.

The output signal of the AGC circuit 9 is supplied to a signal detection circuit 10 for detection of readout information. The readout information detected by the signal detection circuit 10 is supplied to a decoder 11 so as to be decoded thereby. The decoded signal is supplied to a control circuit 6 which outputs the reproduced information to an external device.

The output signal of the AGC circuit 9 is also supplied to a servo demodulation circuit 12 which processes the signal supplied by the AGC circuit 9 so as to demodulate a servo signal and supplies the servo signal to a servo control circuit 13. In accordance with the servo signal supplied by the servo demodulation circuit 12 and the control signal supplied by the control circuit 6, the servo control circuit 13 generates a drive control signal commensurate with a difference between a current position of the magnetic head 5 and a position at which recording or reading should occur. The resultant drive control signal is supplied to a drive circuit 14.

The drive circuit 14 generates a drive signal for driving the actuator 4 in accordance with the drive control signal supplied by the servo control circuit 13. The actuator 14 is driven by the drive signal from the drive circuit 14 so as to move the magnetic head 5 to a target position.

The magnetic disk apparatus 1 records information on the magnetic disk 2 by magnetizing the same. An inherent problem with such magnetic recording is that magnetization reversal for preceding recorded information (bit) on the recording medium causes a shift in the position of current recording so that the position at which target information is written is displaced from an intended position of magnetization reversal.

FIG. 2 shows how magnetization reversal occurs relative to a write signal in case no write compensation is provided. FIG. 2 in (A) shows an input NRZ signal carrying target information supplied from the encoder 7; FIG. 2 in (B) shows a write signal supplied to the magnetic head 3; and FIG. 2 in (C) shows magnetization occurring on the magnetic disk 2.

When no write compensation is provided, the target information supplied by the encoder 7 and the write current supplied to the magnetic head 3 are timed so as to be in phase.

It is assumed that the write current shown in (B) of FIG. 2 is used to magnetize the magnetic disk 2. When the polarity of the write current changes at time t0, the magnetic disk 2 is magnetized by a magnetic field at a polarity opposite to the preceding polarity.

When the polarity of the write current is reversed at time t2 subsequent to time t0 by a small time interval, the direction of magnetization on the magnetic disk 2 is reversed at a position that corresponds to time t1 preceding time t2 because the magnetic disk 2 is affected by the condition that occurred before time t0. Such a phenomenon is known as a non-linear bit shift. If the write operation is continued in this way, information continues to be recorded at positions displaced from respective intended positions of magnetization reversal, thus preventing the information from being properly reproduced from the magnetic disk 2.

For this reason, the magnetic disk apparatus 1 shown in FIG. 1 is provided with the write compensation circuit 8 between the encoder 7 and the head IC 5.

FIG. 3 shows how write compensation is provided in the magnetic disk apparatus according to the related art.

The write compensation circuit 8 according to the related art corrects a non-linear bit shift, that is, write precompensation (WPC) is provided by changing the position, on the recording medium, of magnetization reversal for target information depending on whether or not magnetization reversal for the immediately preceding bit (target information) occurs. Such a correction is intended to ensure that a readout operation properly picks up magnetization reversal.

More specifically, when magnetization reversal occurs successively, an interval preceding a write current reversal for a second bit and subsequent bits is extended as compared to a normal interval, so that magnetization reversal occurs normally on the recording medium.

Referring to FIG. 3, "1" indicates a case where magnetization reversal occurs for the immediately preceding bit; and "0" indicates a case where magnetization reversal does not occur for the immediately preceding bit.

As shown in FIG. 3, the write compensation circuit 8 provides a predetermined delay of t10 to the write current when magnetization reversal occurs successively for the past two bits.

FIG. 4 shows how magnetization reversal occurs relative to a write signal in case write compensation according to the related art is provided. FIG. 4 in (A) shows an input NRZ signal carrying target information supplied from the encoder 7; FIG. 4 in (B) shows a write signal supplied to the magnetic head 3; and FIG. 4 in (C) shows magnetization occurring on the magnetic disk 2.

Referring to (A) of FIG. 4, the input information requires a write current reversal at time t0 and then at time t1. That is, the input information requires that a write current reversal occurs for two successive bits. As shown in (B) of FIG. 4, the write current is reversed at time t2 with a predetermined delay of t10 from time t1, as described with reference to FIG. 3.

As shown in FIG. (C) of FIG. 4, the predetermined delay t10 in the write current causes a delay in magnetization on the magnetic disk 2 such that the magnetic disk 2 is magnetized at a position that corresponds to time t1 exactly when the input information requires a reversal. Thus, magnetization occurs at a position coinciding with reversal in recorded information (shown in (A) of FIG. 4) supplied from the encoder 7.

However, with the improvement in recording density in magnetic disk apparatuses, it is increasingly difficult to neglect an effect caused by magnetization reversal for the bit preceding the current bit (the bit to be recorded) by two bits.

When correcting magnetization reversal occurring for the bit preceding the current bit by two bits, the write compensation according to the related art may perform excessive compensation or insufficient compensation, thus producing an error in positions of magnetization reversal and a resultant failure in proper readout of data.

Referring to FIG. 4, the write compensation method according to the related art times the write current appropriately so that magnetization reversal occurs properly for successive two bits. However, the related art cannot provide proper write compensation when magnetization reversal is required for three successive bits. Referring specifically to (C) of FIG. 4, the magnetization direction that is to occur subsequent to time t3 is the same as the direction for the bit preceding the immediately preceding bit (that is, the bit preceding the target bit for writing by two bits). Accordingly, an effect from magnetization reversal for the immediately preceding bit is partially canceled. Since the related art described above causes the write current to be reversed at time t5 with the predetermined delay t10, the associated magnetization reversal occurs at a position that corresponds to time t4 displaced forward in time from time t3 at which the magnetization reversal should occur, ending up in a displacement between a time-dependent variation in the target information and corresponding positions of magnetization reversal.

SUMMARY OF THE INVENTION

Accordingly, an object of the present invention is to provide write compensation methods and magnetic disk apparatuses in which the aforementioned problem is eliminated.

Another and more specific object is to provide a write compensation method and a magnetic disk apparatus adapted for high-density recording.

The aforementioned objects can be achieved by a write compensation method for correcting a write signal depending on a bit arrangement of the write signal, comprising the steps of: examining the write signal so as to recognize occurrence of magnetization reversal for a first bit to be recorded, a second bit preceding the first bit and a third bit preceding the second bit; delaying a write signal reversal for the first bit by a first delay when the second bit has an associated write signal reversal and when the third bit does not have an associated write signal reversal; delaying a write signal reversal for the first bit by a second delay set to be smaller than the first delay, when the third bit has an associated write signal reversal and when the second bit has an associated write signal reversal; and delaying a write signal reversal for the first bit by a third delay set to be smaller than the second delay, when the third bit has an associated write signal reversal and when the first bit does not have an associated write signal reversal.

According to this aspect of the invention, it is possible to perform write compensation most appropriate for a bit stream of a write signal. Such a write compensation is easy to perform because only the delaying of the write signal is required.

In a second aspect of the invention, the aforementioned objects can also be achieved by a write compensation method for correcting a write signal depending on a bit arrangement of the write signal, comprising the steps of: examining the write signal so as to recognize occurrence of magnetization reversal for a first bit to be recorded, a second bit preceding the first bit and a third bit preceding the second bit; delaying a write signal reversal for the first bit by a first delay when the second bit has an associated write signal reversal; and delaying a write signal reversal for the first bit by a second delay set to be smaller than the first delay, when the third bit has an associated write signal reversal.

According to this aspect of the invention, delays not necessary for the purpose are omitted so that write compensation is performed easily.

In a third aspect of the invention, the aforementioned objects can also be achieved by a write compensation method for correcting a write signal depending on a bit arrangement of the write signal, comprising the steps of: examining the write signal so as to recognize occurrence of magnetization reversal for a first bit to be recorded, a second bit preceding the first bit and a third bit preceding the second bit; delaying a write signal reversal for the first bit by a first delay, when the second bit has an associated write signal reversal and when the third bit does not have an associated write signal reversal; and delaying a write signal reversal for the first bit by a second delay set to be smaller than the first delay, when the second bit has an associated write signal reversal and when the third bit has an associated write signal reversal.

According to this aspect of the invention, delays not necessary for the purpose are omitted so that write compensation is performed easily.

In the first aspect of the invention, the second delay may be set to a value equal to the first delay multiplied by a first factor, and the third delay may be set to a value equal to the first delay multiplied by a second factor smaller than the first factor.

According to this aspect of the invention, the second and third delays are determined automatically by determining the first delay. Since it is not necessary to determine all of the first through third delays individually, the delays are set easily.

The second delay may be set to a value determined by subtracting the third delay from the first delay.

According to this aspect of the invention, the second delay is determined automatically by determining the first and third delays. Since it is not necessary to determine all of the first through third delays individually, the delays are set easily.

The third delay may be set to a value determined by subtracting the second delay from the first delay.

According to this aspect of the invention, the second delay is determined automatically by determining the first and third delays. Since it is not necessary to determine all of the first through third delays individually, the delays are set easily.

The first delay may be set to a value determined by adding the second delay and the third delay.

According to this aspect of the present invention, the second delay is determined automatically by determining the first and third delays. Since it is not necessary to determine all of the first through third delays individually, the delays are set easily.

In the second aspect of the invention, the second delay may be set to a value equal to the first delay multiplied by a predetermined factor. The second delay is automatically determined by determining the first delay. Since it is not necessary to determine both the first and second delays individually, the delays are set easily.

In the third aspect of the invention, the second delay may be set to a value equal to the first delay multiplied by a predetermined factor. The second delay is automatically determined by determining the first delay. Since it is not necessary to determine both the first delay and the second delay individually, the delays are set easily.

In a fourth aspect of the invention, the aforementioned objects can also be achieved by a magnetic disk apparatus comprising: a magnetic head provided opposite to a rotating magnetic disk; magnetic field generating means for generating a magnetic field commensurate with a write signal in the magnetic head; magnetic write means for causing magnetization reversal on the magnetic disk in accordance with the write signal so that information is recorded on the magnetic disk in accordance with the write signal; and write compensation means supplied with the write signal for examining the write signal so as to recognize occurrence of magnetization reversal for a first bit to be recorded, a second bit preceding the first bit and a third bit preceding the second bit, delaying a write signal reversal for the first bit by a first delay when the second bit has an associated write signal reversal and when the third bit does not have an associated write signal reversal, delaying a write signal reversal for the first bit by a second delay set to be smaller than the first delay, when the third bit has an associated write signal reversal and when the second bit has an associated write signal reversal, and delaying a write signal reversal for the first bit by a third delay set to be smaller than the second delay, when the third bit has an associated write signal reversal and when the first bit does not have an associated write signal reversal.

According to this aspect of the invention, it is ensured that positions of magnetization reversal formed on a magnetic disk in accordance with a write signal are made to coincide with input information. Therefore, information is properly read out from the recording medium. Such a write compensation is easy to perform because only the delaying of the write signal is required.

In a fifth aspect of the invention, the aforementioned objects can also be achieved by a magnetic disk apparatus comprising: a magnetic head provided opposite to a rotating magnetic disk; magnetic field generating means for generating a magnetic field commensurate with a write signal in the magnetic head; magnetic write means for causing magnetization reversal on the magnetic disk in accordance with the write signal so that information is recorded on the magnetic disk in accordance with the write signal; and write compensation means supplied with the write signal for examining the write signal so as to recognize occurrence of magnetization reversal for a first bit to be recorded, a second bit preceding the first bit and a third bit preceding the second bit, delaying a write signal reversal for the first bit by a first delay when the second bit has an associated write signal reversal, and delaying a write signal reversal for the first bit by a second delay set to be smaller than the first delay, when the third bit has an associated write signal reversal.

According to this aspect of the invention, delays not necessary for the purpose are omitted so that write compensation is performed easily.

In a sixth aspect of the invention, the aforementioned objects can also be achieved by a magnetic disk apparatus comprising: a magnetic head provided opposite to a rotating magnetic disk; magnetic field generating means for generating a magnetic field commensurate with a write signal in the magnetic head; magnetic write means for causing magnetization reversal on the magnetic disk in accordance with the write signal so that information is recorded on the magnetic disk in accordance with the write signal; and write compensation means supplied with the write signal for examining the write signal so as to recognize occurrence of magnetization reversal for a first bit to be recorded, a second bit preceding the first bit and a third bit preceding the second bit; delaying a write signal reversal for the first bit by a first delay, when the second bit has an associated write signal reversal and when the third bit does not have an associated write signal reversal; and delaying a write signal reversal for the first bit by a second delay set to be smaller than the first delay, when the second bit has an associated write signal reversal and when the third bit has an associated write signal reversal.

According to this aspect of the invention, delays not necessary for the purpose are omitted so that write compensation is performed easily.

In the fourth aspect of the invention, the second delay may be set to a value equal to the first delay multiplied by a first factor, and the third delay may be set to a value equal to the first delay multiplied by a second factor smaller than the first factor.

According to this aspect of the invention, the second and third delays are determined automatically by determining the first delay. Since it is not necessary to determine all of the first through third delays individually, the delays are set easily.

The second delay may be set to a value determined by subtracting the third delay from the first delay.

According to this aspect of the present invention, the second delay is automatically determined by determining the first and third delays. Since it is not necessary to determine all of the first through third delays individually, the delays are set easily.

The third delay may be set to a value determined by subtracting the second delay from the first delay.

According to this aspect of the invention, the second delay is automatically determined by determining the first and third delays. Since it is not necessary to determine all of the first through third delays individually, the delays are set easily.

The first delay may be set to a value determined by adding the second delay and the third delay.

According to this aspect of the invention, the second delay is automatically determined by determining the first and third delays. Since it is not necessary to determine all of the first through third delays individually, the delays are set easily.

In the fifth aspect of the invention, the second delay may be set to a value equal to the first delay multiplied by a predetermined factor.

According to this aspect of the invention, the second delay is automatically determined by determining the first delay. Since it is not necessary to determine both the first and second delays individually, the delays are set easily.

In the sixth aspect of the invention, the second delay may be set to a value equal to the first delay multiplied by a predetermined factor.

According to this aspect of the invention, the second delay is automatically determined by determining the first delay. Since it is not necessary to determine both the first and second delays individually, the delays are set easily.

BRIEF DESCRIPTION OF THE DRAWINGS

Other objects and further features of the present invention will be apparent from the following detailed description when read in conjunction with the accompanying drawings, in which:

FIG. 3 shows how write compensation is provided in the magnetic disk apparatus according to the related art;

DESCRIPTION OF THE PREFERRED EMBODIMENTS

Figure 6:
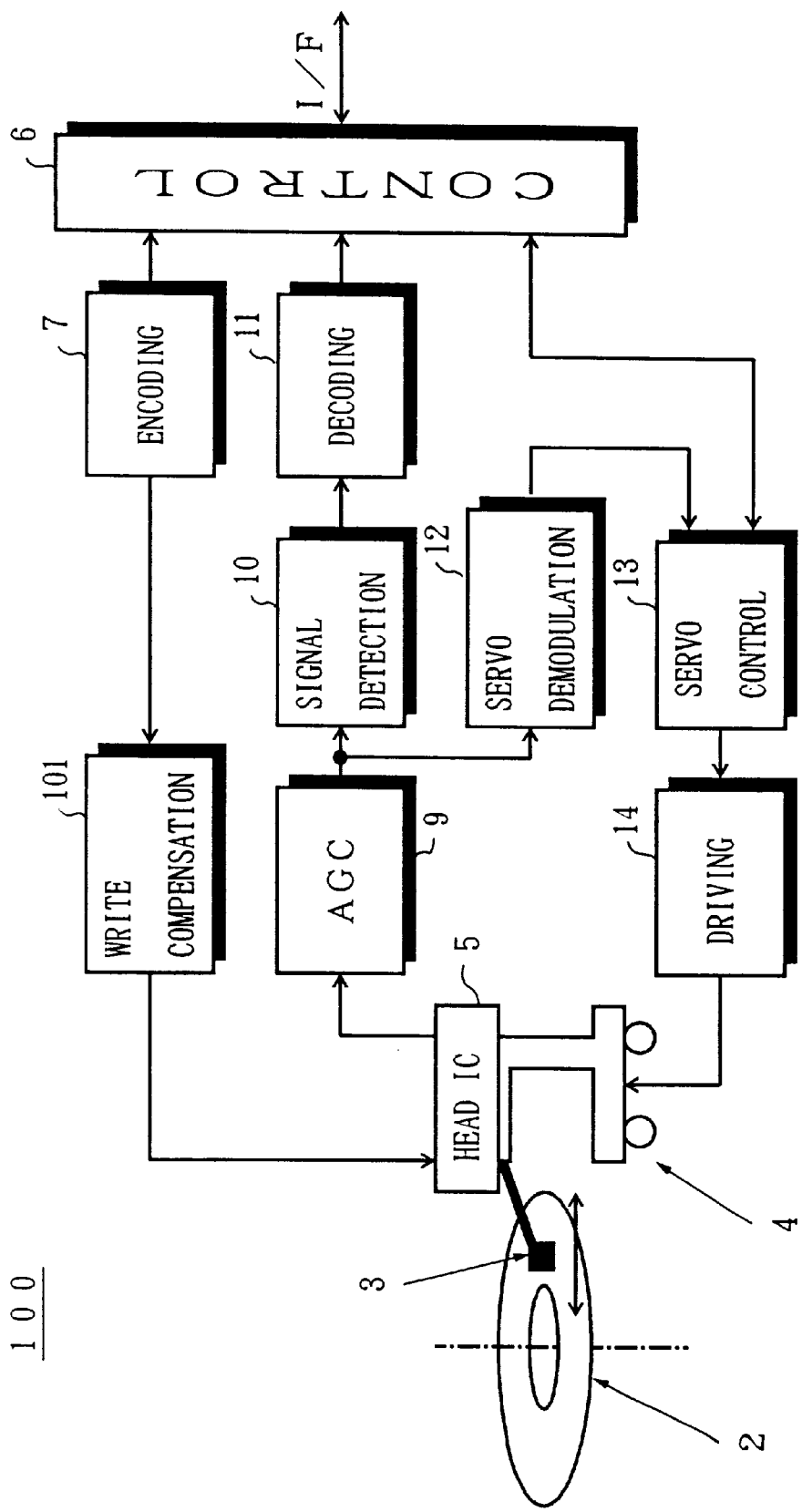
FIG. 6 is a block diagram showing a magnetic disk apparatus according to the present invention.

FIG. 6 is a block diagram showing a magnetic disk apparatus 100 according to the present invention. In FIG. 6, those components that are same as the corresponding components are designated by the same reference numerals and the description thereof is omitted.

Figure 1:
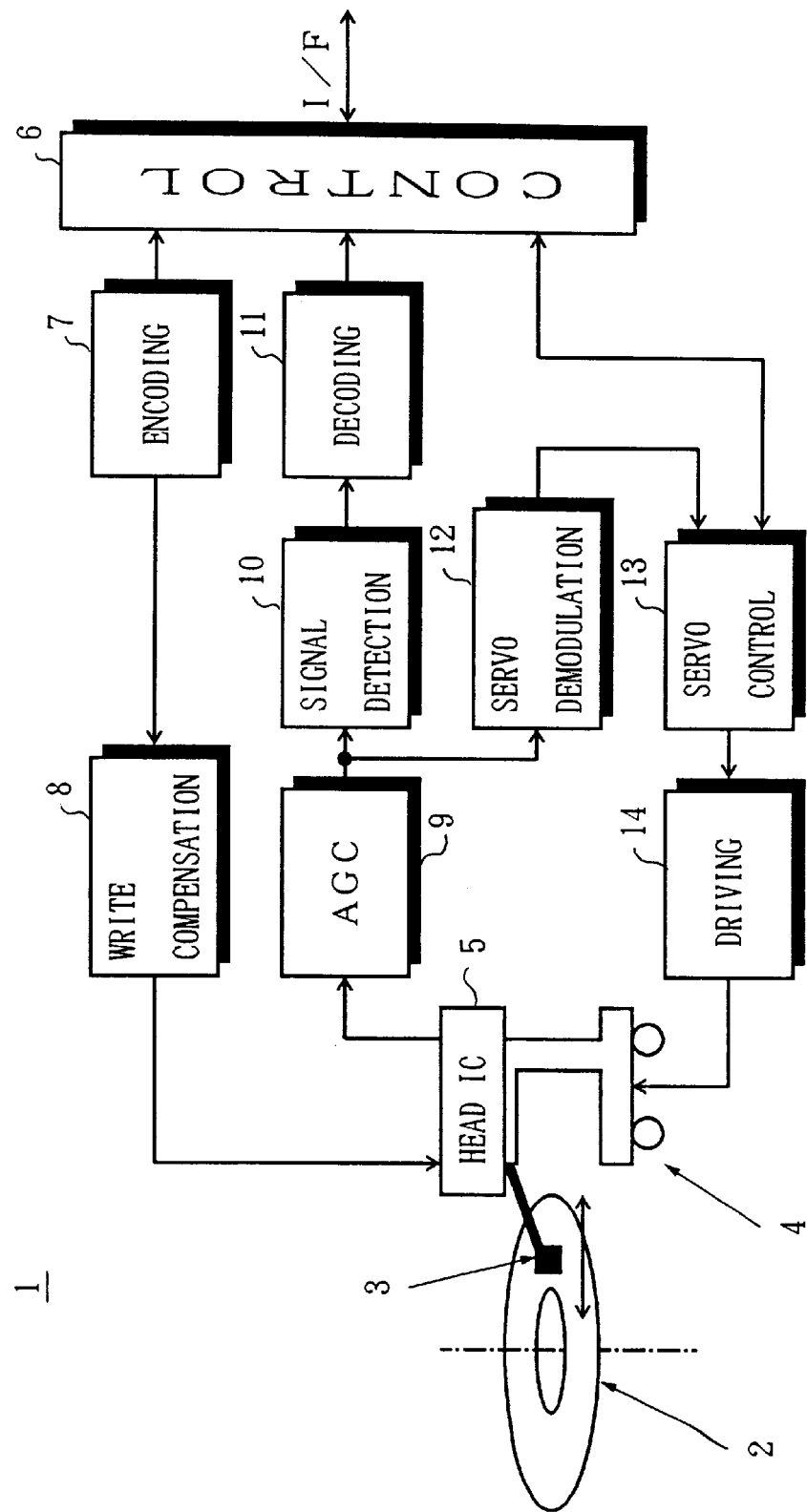
FIG. 1 is a block diagram showing a magnetic disk apparatus according to the related art.
Figure 2:
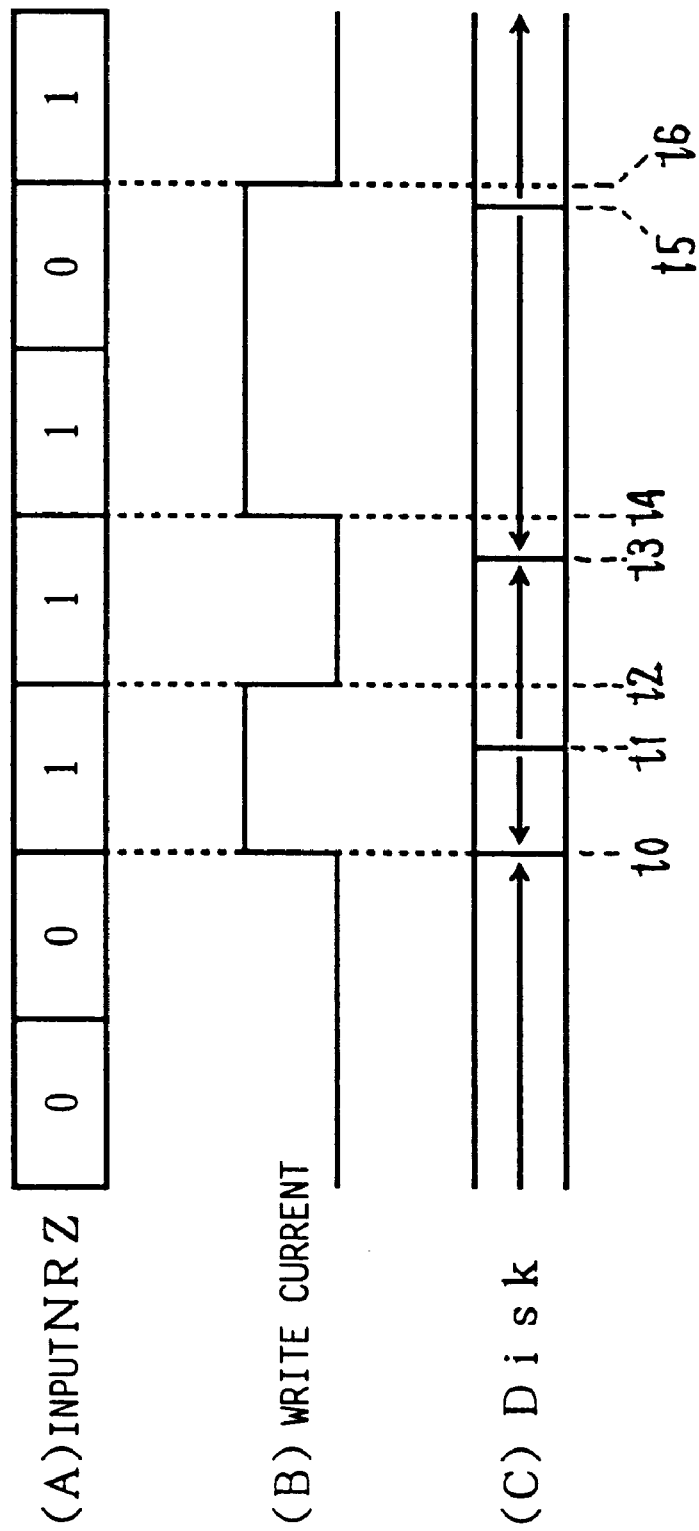
FIG. 2 shows how magnetization reversal occurs relative to a write signal in case no write compensation is provided.
Figure 4:
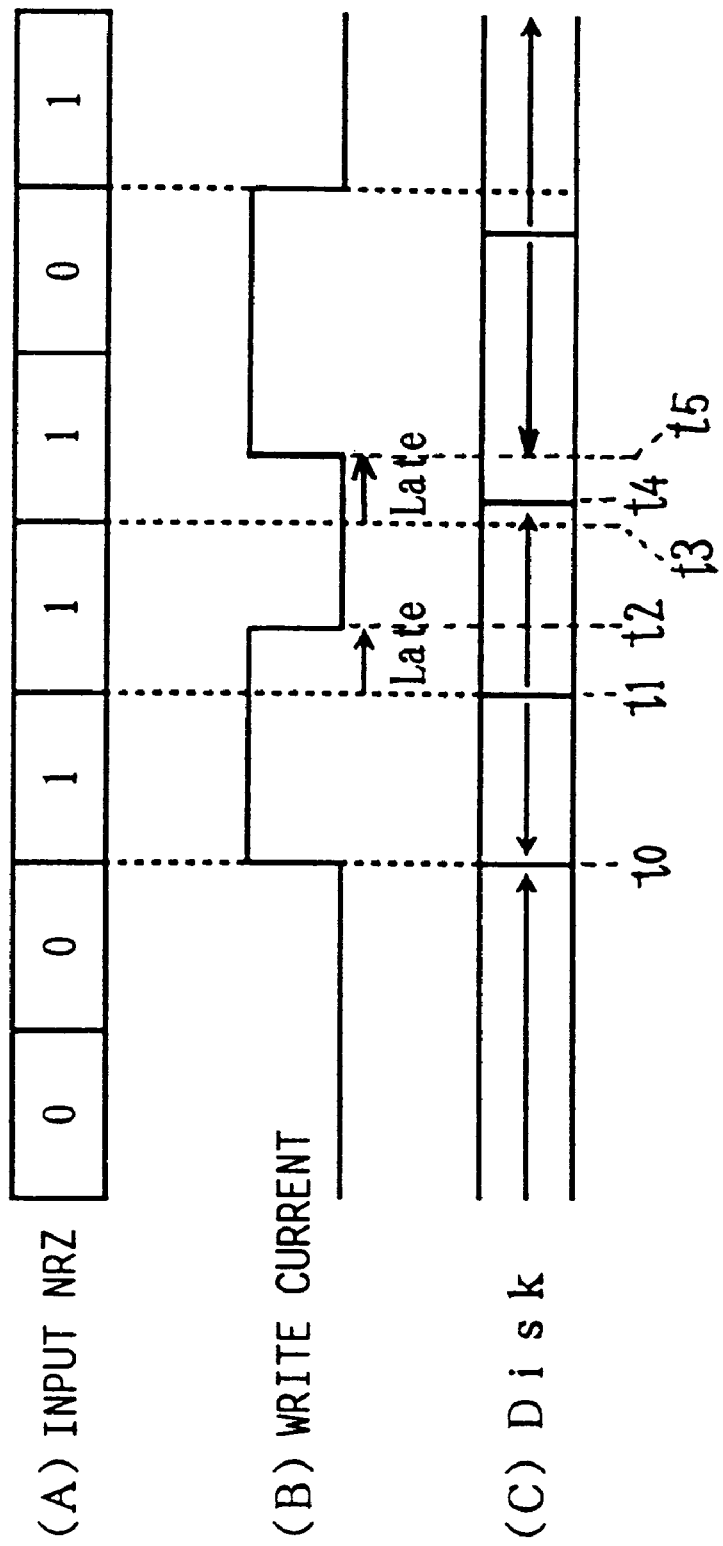
FIG. 4 shows how magnetization reversal occurs relative to a write signal in case write compensation according to the related art is provided.

The magnetic disk apparatus 100 comprises a write compensation circuit 101 which differs from the write compensation circuit 8 of the magnetic disk apparatus shown in FIG. 1. The write compensation circuit 101 corrects positions of signal reversal in the write signal supplied by the encoder 7 and outputs the corrected write signal.

The write compensation circuit 101 receiving the write signal examines a first bit (current bit) to be written, a second bit that precedes the first bit, and a third bit that precedes the second bit. If the second bit requires a reversal in the polarity and if the third bit does not require a reversal, reversal for the first bit is delayed by a first predetermined delay. If the third bit requires a reversal and the second bit also requires a reversal, reversal for the first is delayed by a second predetermined delay smaller than the first predetermined delay. If the third bit requires a reversal and if the first bit does not require a reversal, reversal for the first bit is delayed by a third predetermined delay smaller than the second predetermined delay.

Figure 7:
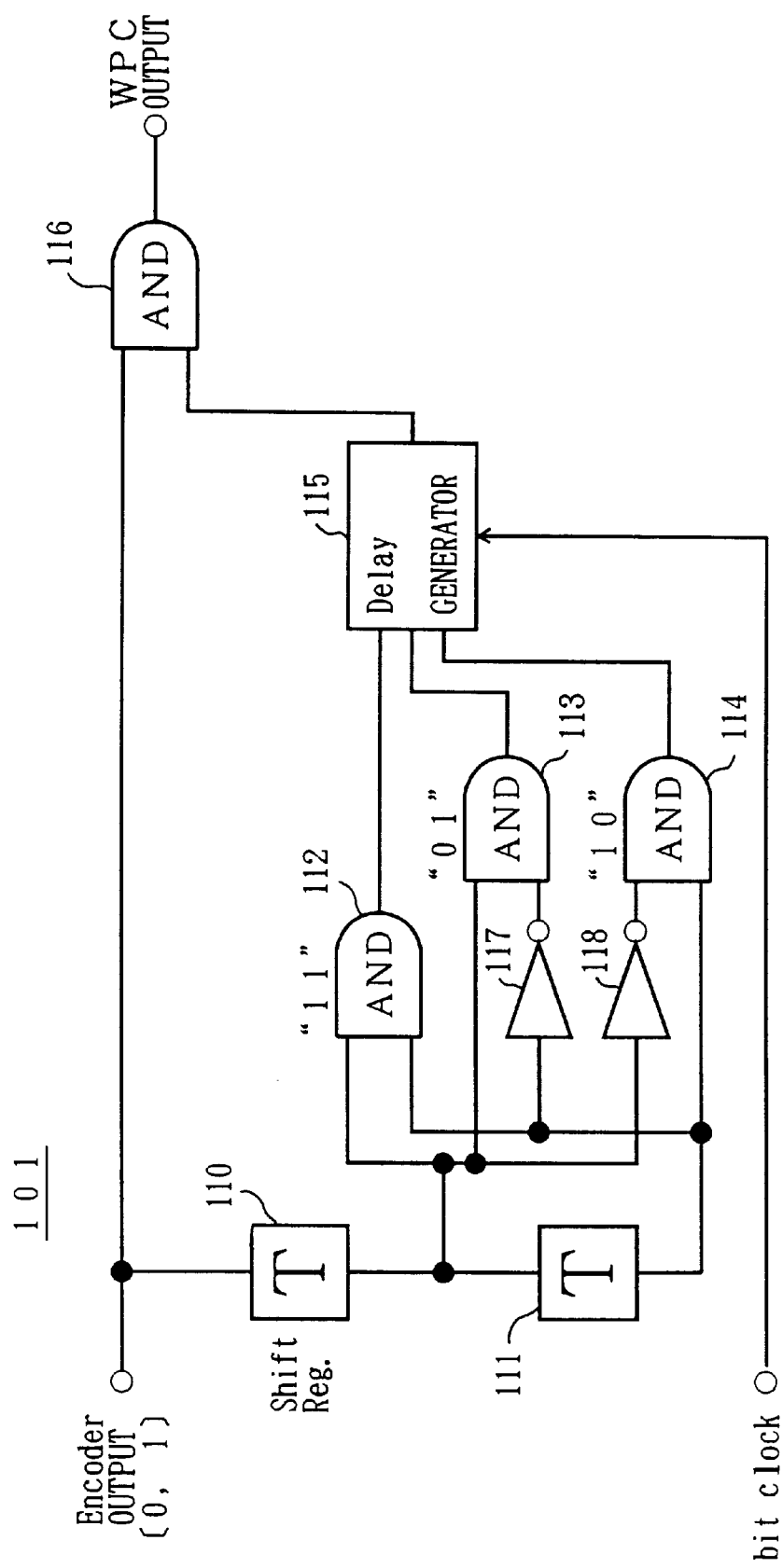
FIG. 7 is a block diagram of a write compensation circuit in the magnetic disk apparatus of the present invention.

FIG. 7 is a block diagram of the write compensation circuit in the magnetic disk apparatus of the present invention.

The write compensation circuit 101 comprises a delay circuit 110 for delaying the target information from the encoder 7 by one bit, a delay circuit 111 for further delaying by one bit the target information delayed by one bit by the delay circuit 110, an AND gate 112 for ANDing the target information delayed by one bit by the delay circuit 110 and the target information delayed by two bits by the delay circuit 111, an inverter 117 for inverting the target information delayed by two bits by the delay circuit 111, an inverter 118 for inverting the target information delayed by one bit by the delay circuit 110, an AND gate 113 for ANDing the target information delayed by one bit by the delay circuit 110 and the output of the inverter 117, an AND gate 114 for ANDing the target information delayed by two bits by the delay circuit 111 and the output of the inverter 118, a delay generator 115 for outputting a pulse signal having a delay $\delta 1$, a delay $\delta 2$ or a delay $\delta 3$ in accordance with the outputs of the AND gates 112, 113 and 114, and an AND gate 116 for ANDing the target information from the encoder 7 and the output pulse from the delay generator 115.

A description will now be given of the operation of the write compensation circuit 101. In the following description, it is assumed that "1" indicates that the bit requires a reversal and "0" indicates that the bit does not require a reversal.

If a bit stream supplied by the encoder 7 is such that the immediately preceding bit and the bit preceding by two bits (the bit preceding the immediately preceding bit) are both "1", the AND gate 112 ANDs the outputs of the delay circuit 110 and the delay circuit 111 so as to output "1". The AND gate 113 ANDs the output bit "1" of the delay circuit 110 and the bit "0" obtained by inverting the output bit of the delay circuit 111 so as to output "0". The AND gate 114 ANDs the logical input "0" obtained by inverting the output bit "1" of the delay circuit 110 and the output bit "1" of the delay circuit 111 so as to output "0".

If a supplied bit stream is such that the immediately preceding bit is "1" and the bit preceding by two bits is "0", the AND gate 112 is supplied with "1" by the delay circuit 110 and "0" by the delay circuit 111 so as to output "0". The AND gate 113 is supplied with "1" obtained by inverting the output bit "0" of the delay circuit 111 so that the inputs are both "1". Therefore, the AND gate 113 outputs "1". The AND gate 114 is supplied with "0" obtained by inverting the output bit "1" of the delay circuit 110 so that the inputs are both "0". Therefore, the AND gate 114 outputs "0".

If a supplied bit stream is such that the immediately preceding bit is "0" and the bit preceding by two bits is "1", the AND gate 112 is supplied with "0" and "1" from the delay circuit 110 and the delay circuit 111, respectively, so that the output of the AND gate 112 is "0". The AND gate 113 is supplied with "0" obtained by inverting the output bit "1" of the delay circuit 111 so that the inputs are both "0". Therefore, the AND gate circuit 113 outputs "1". The AND gate 114 is supplied with "1" obtained by inverting the output bit "0" of the delay circuit 110 so that the inputs are both "1". Therefore, the AND gate 114 outputs "1".

The delay generator 115 is supplied with a clock representative of a bit. The delay generator 115 provides a delay $\delta 1$, a delay $\delta 2$ or a delay $\delta 3$ to the clock depending on the outputs of the AND gates 112–114 and outputs the delayed clock. The delays $\delta 1$, $\delta 2$ and $\delta 3$ are set such that $$0 \leq \delta 3 \leq \delta 2 \leq \delta 1$$

The delays $\delta 1$, $\delta 2$ and $\delta 3$ are set depending on the normalized linear density, as described later.

The delay generator 115 determines that the bit stream is "0, 1, 1" when the output bit of the AND gate 113 is "1". In this case, the delay generator 115 generates the maximum delay $\delta 1$. When the output bit of the AND gate 112 is "1", it is determined that the bit stream is "1, 1, 1". In this case, the delay generator 115 generates the delay $\delta 2$. When the output bit of the AND gate 111 is "1", it is determined that the bit stream is "1, 0, 1". In this case, the delay generator 115 generates the delay $\delta 3$. The delay generator 115 outputs "1" provided with the selected delay.

The output bit of the delay generator 115 is output to the AND gate 116. The output of the AND gate 116 turns to "1" when the output bit of the encoder 7 is "1" (requiring a reversal) and when the delayed output of the delay generator 115 is "1". The output from the AND gate 116 is provided with the delay $\delta 1$, $\delta 2$ or $\delta 3$ selected by the delay generator 115.

Figure 8:
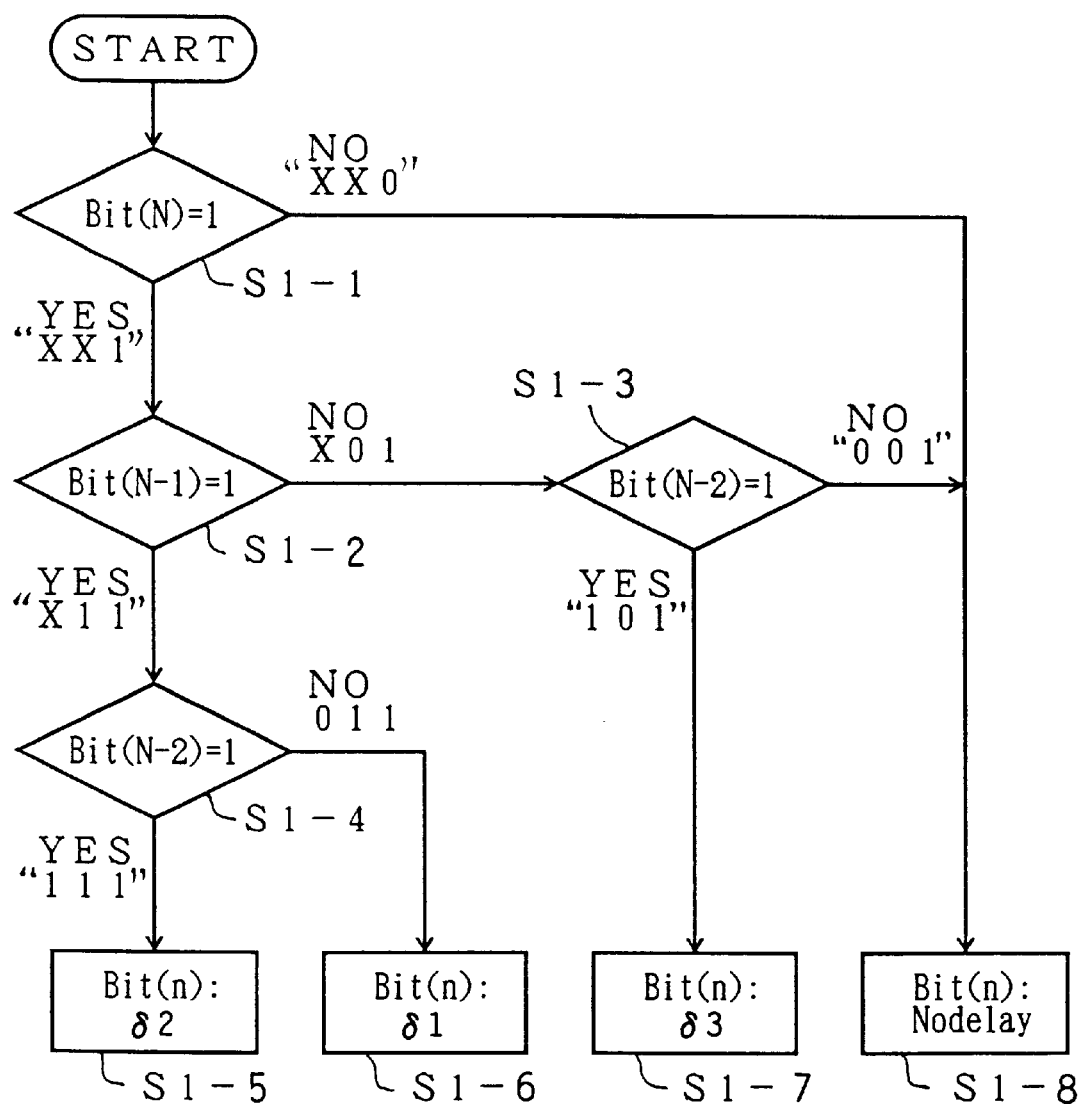
FIG. 8 is a flowchart of the operation of write compensation according to the present invention.

FIG. 8 is a flowchart of the operation of write compensation according to the present invention effected by the write compensation circuit shown in FIG. 7.

In this operation, the delay $\delta 1$, $\delta 2$ or $\delta 3$ for write compensation is switched from one to another depending on how magnetization reversal is required by the immediately preceding bit and the bit preceding by two bits.

Referring to FIG. 8, steps S1-1 through S1-4 are the steps for determining whether the immediately preceding bit and the bit preceding by two bits require magnetization reversal. Steps S1-5 through S1-8 are the steps performed for write compensation.

The write compensation circuit 101 according to the present invention controls write compensation by examining the pattern of Bit(N) to be recorded currently, Bit(N−1) immediately preceding the bit to be recorded currently, and Bit(N−2) preceding the bit to be recorded currently by two bits. Bit(N) will be referred to as a first bit; Bit(N−1) will be referred to as a second bit; and Bit(N−2) will be referred to as a third bit.

Figure 5:
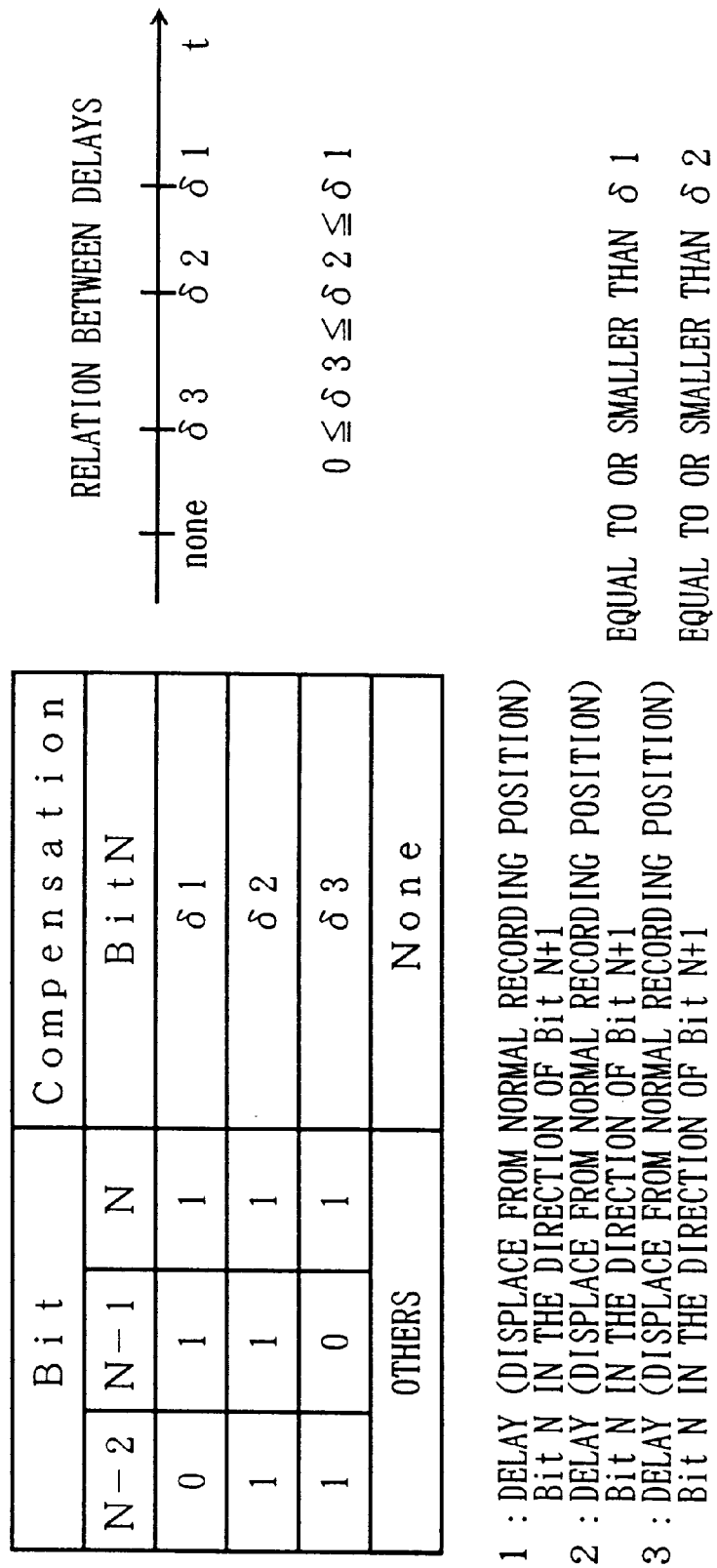
FIG. 5 shows write compensation according to the present invention.

FIG. 5 shows write compensation according to the present invention.

Referring to FIG. 5, "1" indicates a case where magnetization reversal occurs for the immediately preceding bit; "0" indicates a case where magnetization reversal does not occur for the immediately preceding bit; and "X" indicates that occurrence of magnetization reversal is disregarded.

When magnetization reversal does not occur for Bit(N) subsequent to Bit(N−1), that is, when Bit(N)=0, no compensation is performed irrespective of Bit(N−1) and Bit(N−2). Stated otherwise, no compensation is performed when Bit(N−2, N−1, N)=[X, X, 0].

Also, no compensation is performed when Bit(N−2, N−1, N)=[0, 0, 1].

When Bit(N−2, N−1, N)=[0, 1, 1], magnetization reversal occurs for two successive bits, write compensation using the maximum delay $\delta 1$ is performed.

When Bit(N−2, N−1, N)=[1, 1, 1], that is, when magnetization reversal occurs for three successive bits, an effect from magnetization reversal for the immediately preceding bit is reduced due to magnetization for the bit preceding the current bit to be recorded by two bits. In this case, write compensation using the delay $\delta 2$ smaller than the delay 1 is performed.

When Bit(N−2, N−1, N)=[1, 0, 1], a bit shift due to magnetization reversal for the bit preceding by two bits is sufficiently small to be corrected by the delay $\delta 3$ smaller than the delay $\delta 2$.

Figure 9:
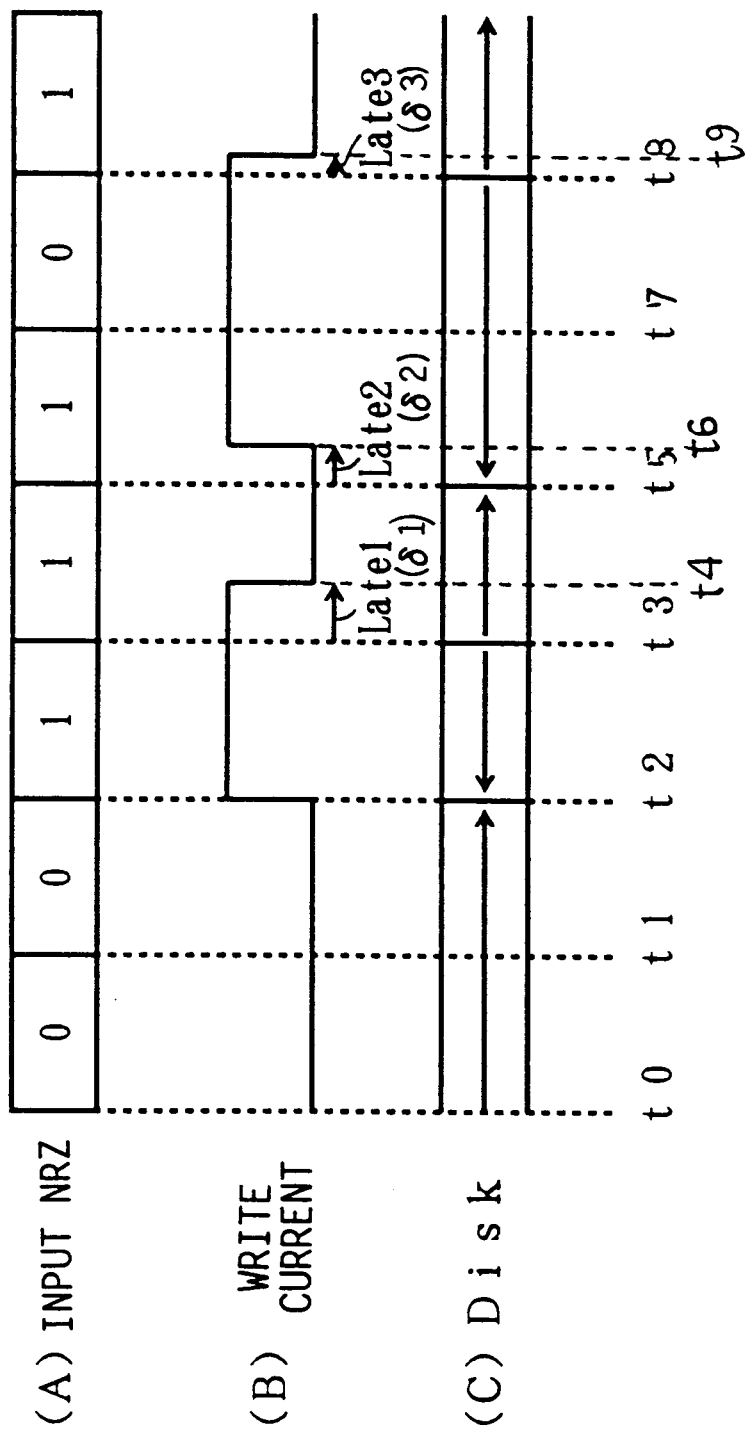
FIG. 9 shows how magnetization reversal occurs relative to a write signal according to the present invention.

FIG. 9 shows how magnetization reversal occurs relative to a write signal according to the present invention.

As shown in (B) of FIG. 9, the bit stream examined at time t3 is such that Bit(N−2, N−1, N)=[0, 1, 1] since there is no reversal at time t1, that is, for the bit preceding by two bits, and there is a reversal at time t2, that is, for the immediately preceding bit. Therefore, the write current is delayed from time t3 by the maximum delay $\delta 1$ so that the write current reversal occurs at time t4. With this arrangement, positions of magnetization reversal as shown in (C) of FIG. 9 are made to coincide with the corresponding input bits shown in (A) of FIG. 9.

Referring also to (B) of FIG. 9, the bit stream examined at time t5 is such that Bit(N−2, N−1, N)=[1, 1, 1], since there is a reversal at time t2, that is, for the bit preceding by two bits, and there is a reversal at time t3, that is, for the immediately preceding bit. Therefore, the write current is delayed from time t5 by the delay $\delta 2$ smaller than the maximum delay $\delta 1$ so that the write current reversal occurs at time t6. The reason for this arrangement is that magnetization reversal for the immediately preceding bit is partially canceled by magnetization for the bit preceding by two bits. With this arrangement, positions of magnetization reversal shown in (C) of FIG. 9 are made to coincide with the corresponding input bits shown in (A) of FIG. 9.

Referring also to (B) of FIG. 9, the bit stream examined at time t8 is such that Bit(N−2, N−1, N)=[1, 0, 1], since there is a reversal at time t5, that is, for the bit preceding by two bits, and there is a reversal at time t7, that is, for the immediately preceding bit. Therefore, the write current is delayed from time t8 by the minimum delay $\delta 3$ so that the write current reversal occurs at time t9. The reason for this arrangement is that magnetization for the bit at time t8 is affected only by magnetization for the bit preceding by two bits. With this arrangement, positions of magnetization reversal shown in (C) of FIG. 9 are made to coincide with the corresponding input bits shown in (A) of FIG. 9.

Since the delays are set depending on the distance-related pattern of magnetization reversal for preceding bits, the delays δ2 and δ3 are related to the delay δ1 such that $$\delta 2 = \alpha \times \delta 1 \quad (1)$$

$$\delta 3 = \beta \times \delta 1 \quad (2)$$

where α and β are factors of proportionality (0≦(α, β)≦1).

In an ideal case, an effect in the form of a bit shift caused by magnetization reversal for the bit preceding by two bits in the presence of magnetization reversal for the immediately preceding bit is the same in magnitude as an effect caused by magnetization for the bit preceding by two bits in the absence of magnetization reversal for the immediately preceding bit. These effects differ only in the polarity. Therefore, the following approximation obtains.

$$\delta 2 = \delta 1 - \delta 3$$

or $$\delta 3 = \delta 1 - \delta 2$$

Following from this, the relation δ1=δ2+δ3 may be used to set the delays.

Alternatively, the above equation may not be relied upon. The delays δ1, δ2 and δ3 may be determined independently and in accordance with the actual measurement. It is important that write compensation of a magnitude "0" is available.

Figure 10:
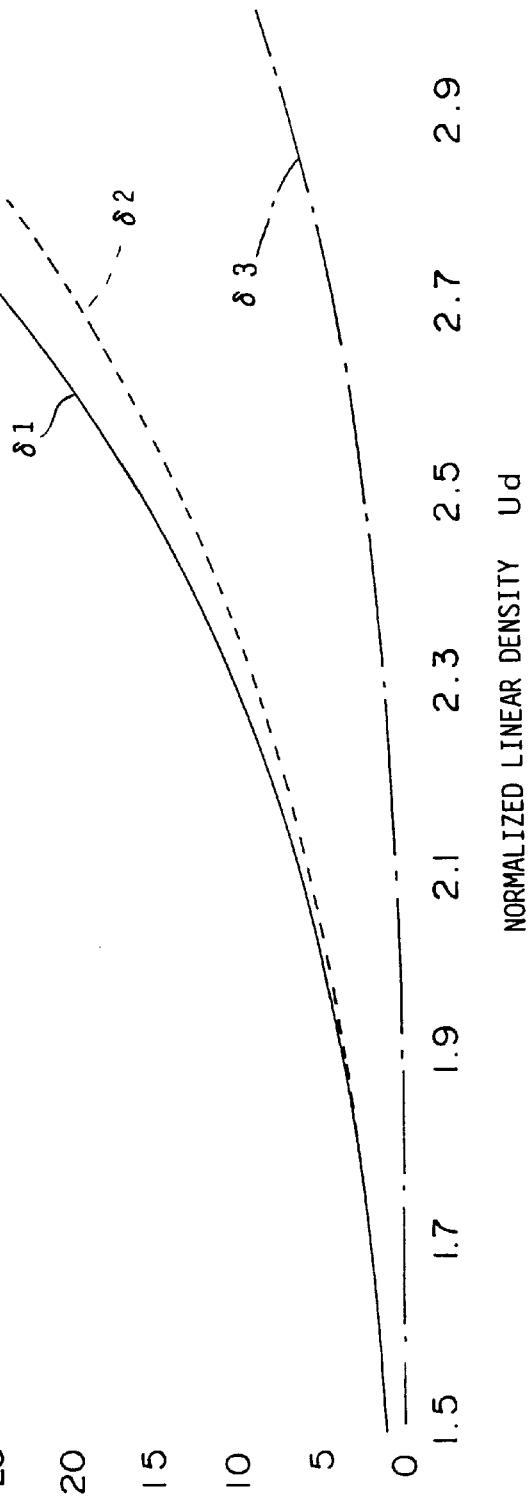
FIG. 10 is a graph showing a relation between characteristics derived from delays $\delta 1$, $\delta 2$ and $\delta 3$ and a normalized linear density.

FIG. 10 is a graph showing a relation between the delays δ1, δ2 and δ3 and the normalized linear density determined as a result of actual measurements. The solid line indicates appropriate levels of the delay δ1 as the normalized linear density varies. The broken line indicates appropriate levels of the delay δ2 as the normalized linear density varies. The alternate short and long dash line indicates appropriate levels of the delay δ3 as the normalized linear density varies. In FIG. 10, the delays are represented in percentage of a one-bit interval.

The factors α and β, and the delays δ1, δ2 and δ3 are set in accordance with these relations.

In this embodiment, magnetization reversal for the past two bits is examined. When magnetization reversal is repeated for two bits, the maximum delay δ1 is provided to the write current. When magnetization reversal is repeated for three bits, the bit shift is smaller than when magnetization reversal is repeated for two bits due to an effect from magnetization reversal preceding by two bits. Accordingly, the write current reversal is delayed by the delay δ2 which is smaller than the delay δ1.

When magnetization is repeated for successive bits, adjacent magnetization reversal acts to reduce an interval between magnetization reversal and magnetization reversal preceding by two bits acts to enlarge an interval between magnetization reversal. Since the action is inversely proportional to the interval of magnetization reversal, the action derived from adjacent magnetization is larger than the action derived from magnetization reversal preceding by two bits. When magnetization reversal does not occur for an immediately preceding bit but occurs for the bit preceding by two bits, magnetization reversal preceding by two bits acts to reduce an interval between magnetization reversal. In this case, the delay δ3 which is smaller than the delay δ2 is used for write compensation. Such a write compensation ensures that magnetization reversal occurs at appropriate intervals on a recording medium and eliminates an error occurring in readout due to the bit shift.

The embodiment described above is a full-scale implementation that takes into account magnetization reversal preceding by two bits. Depending on the characteristic of a recording head and a recording medium, the variety of write compensation may be reduced such that only the delays δ1 and δ2 may be employed or only the delays δ1 and δ3 may be employed.

Figure 11:
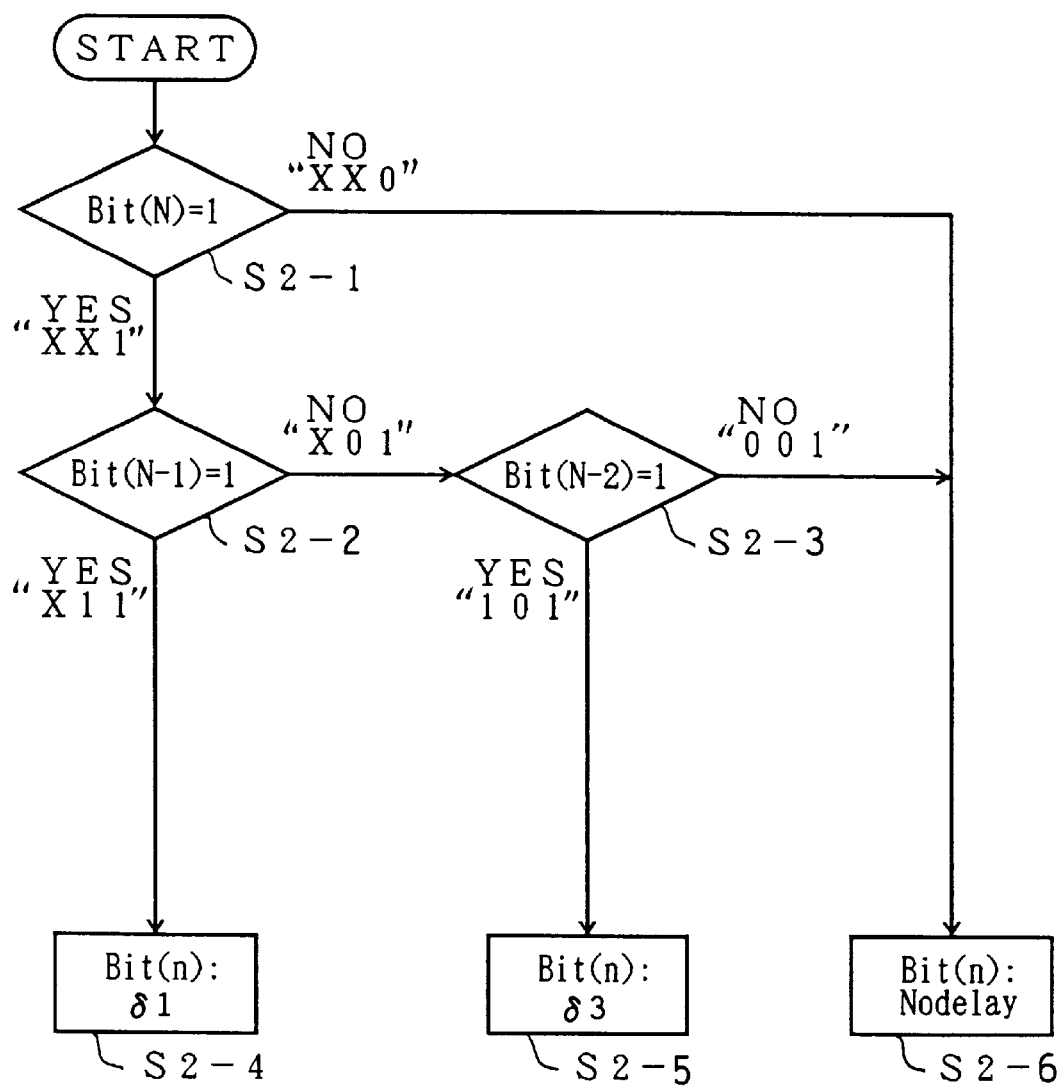
FIG. 11 is a flowchart of the operation of write compensation according to a first variation of the present invention effected by the write compensation circuit of the magnetic disk apparatus of the present invention.

FIG. 11 is a flowchart of the operation of write compensation according to a first variation of the present invention effected by the write compensation circuit of the magnetic disk apparatus 100.

The process shown in FIG. 11 is employed in a case where write compensation is required only when magnetization reversal is repeated for two or more bits or when magnetization reversal preceding by two bits occurs.

In the first variation, steps S2-1 through S2-3 are executed to determine whether a bit stream is Bit(N−2, N−1, N)=[X, 1, 1], Bit(N−2, N−1, N)=[1, 0, 1] or otherwise. If it is determined in steps S2-4 through S2-6 that the bit stream is Bit(N−2, N−1, N)=[X, 1, 1], write compensation using the delay δ1 is performed. If it is determined that the bit stream is Bit(N−2, N−1, N)=[1, 0, 1], write compensation using the delay δ3 is performed. Otherwise, write compensation is not performed.

The delays δ1 and δ3 may be set such that $$\delta 3 = \beta \times \delta 1$$

where β is a factor of proportionality. Alternatively, the delays δ1 and δ3 may be set independently without relying on the above relation.

It is important that the delays δ1 and δ3 can be individually set to "0".

Figure 12:
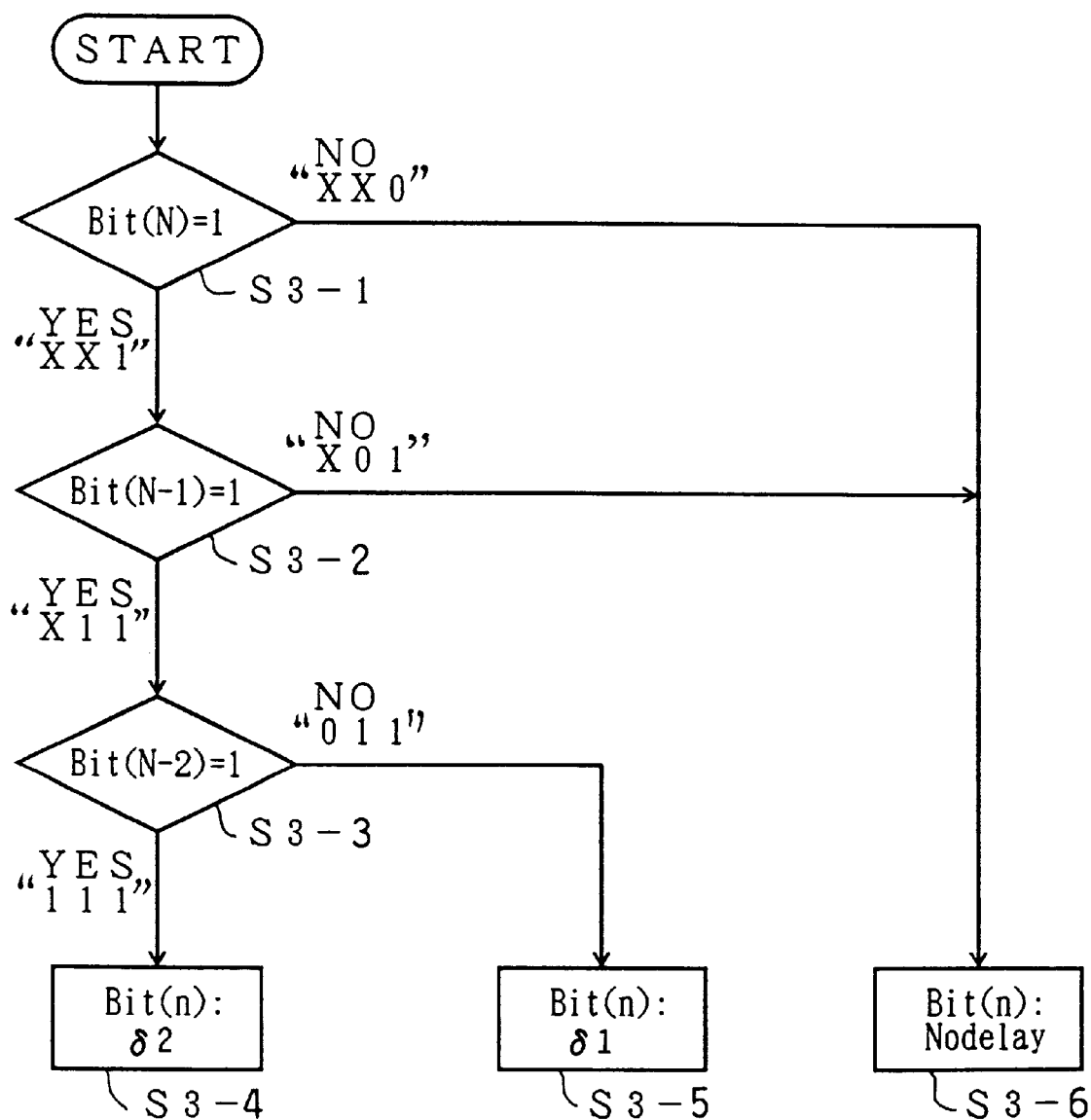
FIG. 12 is a flowchart of the operation of write compensation according to a second variation of the present invention effected by the write compensation circuit of the magnetic disk apparatus of the present invention.

FIG. 12 is a flowchart of the operation of write compensation according to a second variation of the present invention effected by the write compensation circuit of the magnetic disk apparatus 100.

The process shown in FIG. 12 is employed in a case where write compensation is required only when magnetization reversal is repeated for two bits or when magnetization reversal is repeated for three bits.

In the second variation, steps S3-1 through S3-3 are executed to determine whether a bit stream is Bit(N−2, N−1, N)=[0, 1, 1], Bit(N−2, N−1, N)=[1, 1, 1] or otherwise. If it is determined in steps S3-4 through S3-6 that the bit stream is Bit(N−2, N−1, N)=[0, 1, 1], write compensation using the maximum delay δ1 is performed. If it is determined that the bit stream is Bit(N−2, N−1, N)=[1, 1, 1], write compensation using the delay δ2 is performed. Otherwise, write compensation is not performed.

The delays δ1 and δ2 may be set such that $$\delta 2 = \alpha \times \delta 1$$

where β is a factor of proportionality. Alternatively, the delays δ1 and δ2 may be set independently without relying on the above relation.

It is important that the delays δ1 and δ2 can be individually set to "0".

As described above, by performing write compensation that takes into account a non-linear bit shift, the non-linear bit shift is successfully eliminated so that an error rate in data readout is reduced. Thus, the present invention contributes a great deal to improving the performance of magnetic recording apparatuses.

The present invention is not limited to the above described embodiments, and variations and modifications may be made without departing from the scope of the present invention.

What is claimed is:

1. A write compensation method for correcting a write signal depending on a bit arrangement of said write signal, comprising the steps of:

examining said write signal so as to recognize occurrence of magnetization reversal for a first bit to be recorded, a second bit preceding said first bit and a third bit preceding said second bit;

delaying a write signal reversal for said first bit by a first delay when said second bit has an associated write signal reversal and when said third bit does not have an associated write signal reversal;

delaying a write signal reversal for said first bit by a second delay set to be smaller than said first delay, when said third bit has an associated write signal reversal and when said second bit has an associated write signal reversal; and delaying a write signal reversal for said first bit by a third delay set to be smaller than said second delay, when said third bit has an associated write signal reversal and when said first bit does not have an associated write signal reversal.

2. The write compensation method as claimed in claim 1, wherein said second delay is set to a value equal to said first delay multiplied by a first factor, and said third delay is set to a value equal to said first delay multiplied by a second factor smaller than said first factor.

3. The write compensation method as claimed in claim 1, wherein said second delay is set to a value determined by subtracting said third delay from said first delay.

4. The write compensation method as claimed in claim 1, wherein said third delay is set to a value determined by subtracting said second delay from said first delay.

5. The write compensation method as claimed in claim 1, wherein said first delay is set to a value determined by adding said second delay and said third delay.

6. A write compensation method for correcting a write signal depending on a bit arrangement of said write signal, comprising the steps of:

examining said write signal so as to recognize occurrence of magnetization reversal for a first bit to be recorded, a second bit preceding said first bit and a third bit preceding said second bit;

delaying a write signal reversal for said first bit by a first delay when said second bit has an associated write signal reversal; and delaying a write signal reversal for said first bit by a second delay set to be smaller than said first delay, when said third bit has an associated write signal reversal.

7. The write compensation method as claimed in claim 2, wherein said second delay is set to a value equal to said first delay multiplied by a predetermined factor.

8. A write compensation method for correcting a write signal depending on a bit arrangement of said write signal, comprising the steps of:

examining said write signal so as to recognize occurrence of magnetization reversal for a first bit to be recorded, a second bit preceding said first bit and a third bit preceding said second bit;

delaying a write signal reversal for said first bit by a first delay, when said second bit has an associated write signal reversal and when said third bit does not have an associated write signal reversal; and delaying a write signal reversal for said first bit by a second delay set to be smaller than said first delay, when said second bit has an associated write signal reversal and when said third bit has an associated write signal reversal.

9. The write compensation method as claimed in claim 8, wherein said second delay is set to a value equal to said first delay multiplied by a predetermined factor.

10. A magnetic disk apparatus comprising:

a magnetic head provided opposite to a rotating magnetic disk;

magnetic field generating means for generating a magnetic field commensurate with a write signal in said magnetic head;

magnetic write means for causing magnetization reversal on said magnetic disk in accordance with said write signal so that information is recorded on said magnetic disk in accordance with said write signal; and write compensation means supplied with said write signal for examining said write signal so as to recognize occurrence of magnetization reversal for a first bit to be recorded, a second bit preceding said first bit and a third bit preceding said second bit, delaying a write signal reversal for said first bit by a first delay when said second bit has an associated write signal reversal and when said third bit does not have an associated write signal reversal, delaying a write signal reversal for said first bit by a second delay set to be smaller than said first delay, when said third bit has an associated write signal reversal and when said second bit has an associated write signal reversal, and delaying a write signal reversal for said first bit by a third delay set to be smaller than said second delay, when said third bit has an associated write signal reversal and when said first bit does not have an associated write signal reversal.

11. The magnetic disk apparatus as claimed in claim 10, wherein said second delay is set to a value equal to said first delay multiplied by a first factor, and said third delay is set to a value equal to said first delay multiplied by a second factor smaller than said first factor.

12. The magnetic disk apparatus as claimed in claim 10, wherein said second delay is set to a value determined by subtracting said third delay from said first delay.

13. The magnetic disk apparatus as claimed in claim 10, wherein said third delay is set to a value determined by subtracting said second delay from said first delay.

14. The magnetic disk apparatus as claimed in claim 10, wherein said first delay is set to a value determined by adding said second delay and said third delay.

15. A magnetic disk apparatus comprising:

a magnetic head provided opposite to a rotating magnetic disk;

magnetic field generating means for generating a magnetic field commensurate with a write signal in said magnetic head;

magnetic write means for causing magnetization reversal on said magnetic disk in accordance with said write signal so that information is recorded on said magnetic disk in accordance with said write signal; and write compensation means supplied with said write signal for examining said write signal so as to recognize occurrence of magnetization reversal for a first bit to be recorded, a second bit preceding said first bit and a third bit preceding said second bit, delaying a write signal reversal for said first bit by a first delay when said second bit has an associated write signal reversal, and delaying a write signal reversal for said first bit by a second delay set to be smaller than said first delay, when said third bit has an associated write signal reversal.

16. The magnetic disk apparatus as claimed in claim 15, wherein said second delay is set to a value equal to said first delay multiplied by a predetermined factor.

17. A magnetic disk apparatus comprising:

a magnetic head provided opposite to a rotating magnetic disk;

magnetic field generating means for generating a magnetic field commensurate with a write signal in said magnetic head;

magnetic write means for causing magnetization reversal on said magnetic disk in accordance with said write signal so that information is recorded on said magnetic disk in accordance with said write signal; and write compensation means supplied with said write signal for examining said write signal so as to recognize occurrence of magnetization reversal for a first bit to be recorded, a second bit preceding said first bit and a third bit preceding said second bit;

delaying a write signal reversal for said first bit by a first delay, when said second bit has an associated write signal reversal and when said third bit does not have an associated write signal reversal; and delaying a write signal reversal for said first bit by a second delay set to be smaller than said first delay, when said second bit has an associated write signal reversal and when said third bit has an associated write signal reversal.

18. The magnetic disk apparatus as claimed in claim 17, wherein said second delay is set to a value equal to said first delay multiplied by a predetermined factor.

* * * * *

UNITED STATES PATENT AND TRADEMARK OFFICE
CERTIFICATE OF CORRECTION

PATENT NO. : 6,157,506
DATED : December 5, 2000
INVENTOR(S) : Hiroaki Ueno

Page 1 of 1

It is certified that error appears in the above-identified patent and that said Letters Patent is hereby corrected as shown below:

<u>Claim 7,</u>
Line 1, delete "2" and insert -- 6 -- therefor.

Signed and Sealed this

Nineteenth Day of March, 2002

Attest:

JAMES E. ROGAN
*Attesting Officer*        *Director of the United States Patent and Trademark Office*